United States Patent [19]

Job

[11] Patent Number: 5,449,491
[45] Date of Patent: Sep. 12, 1995

[54] METHOD OF PRODUCING DIAMOND CRYSTALS FROM METALLFULLERITE MATRIX AND RESULTING PRODUCT

[75] Inventor: Robert C. Job, Charlotte, N.C.

[73] Assignee: MicroMet Technology, Inc., Monroe, N.C.

[21] Appl. No.: 386,195

[22] Filed: Feb. 9, 1995

Related U.S. Application Data

[63] Continuation of Ser. No. 921,904, Jul. 29, 1992, abandoned, which is a continuation-in-part of Ser. No. 820,842, Jan. 15, 1992, abandoned.

[51] Int. Cl.$^6$ .................. C22C 38/00; C22C 26/00; C21D 1/18
[52] U.S. Cl. ................... 420/590; 148/540; 148/579; 423/446
[58] Field of Search ............ 148/538, 540–543, 148/320, 421, 423, 425, 426, 579; 420/590; 423/446

[56] References Cited

FOREIGN PATENT DOCUMENTS

92/04279  3/1992  .

OTHER PUBLICATIONS

Baum, "High Pressure changes $C_{60}$ to diamond", Jan. 20, 1992, C&EN p. 5.
Moffat, "When Diamonds Met Buckyballs", Science, vol. 254, Nov. 8, 1991, p. 800.
Regueiro et al., "Crushing $C_{60}$ to Diamond at Room Temperature" Nature, vol. 355, Jan. 16, 1991 pp. 237–239.
David Stipp; *Wall Street Journal,* Nov. 6, 1991; "Researchers Find a Way to Form Film of Diamond Using Carbon 'Buckyballs'"; Technology & Health Section.
Clifford Glockman; *The Charlotts Observer, Jan. 17, 1992;* "Is Rhondite the Steel of Future?"; Business Section.
Rudy M. Baum, *Chemical & Engineering News, Dec. 16, 1991;* "Systematic Chemistry of $C_{60}$ Beginning to Emerge"; pp. 17–20.
Rudy Baum; *Chemical & Engineering News,* Jan. 20, 1992; "High Pressure Changes $C_{60}$ To Diamond"; p. 5.
Rudy Baum; *Chemical & Engineering News,* Mar. 23, 1992; "$C_{60}$ Displays Intriguing Optical Properties"; p. 6.
"Science/Technology Concentrates", *Chemical & Engineering News,* Feb. 17, 1992; p. 25.
"Science/Technology Concentrates"; *Chemical & Engineering News,* Apr. 20, 1992, p. 18.
"Science/Technology"; *Chemical & Engineering News,* May 18, 1992; p. 26.
Joseph Haggin; *Chemical & Engineering News,* Apr. 20, 1992; "Studies Shed Light on Fullerene Structures"; pp. 22, 24.
Gary McWilliams, et al; *Business Week,* Dec. 9, 1991; "Science's Amazing New Building Blocks"; pp. 76–77.
Pamela J. Black; *Business Week,* Jan. 20, 1992; "Steel With Much More Muscle"; p. 86.
Donald R. Huffman; *Physics Today;* Nov. 1991; "Solid $C_{60}$"; pp. 22–29.
*Futuretech,* No. 146; "Strategic Markets"; Feb. 17, 1992.
*The Economist,* Jul. 25, 1992; "Steeling Diamonds".

(List continued on next page.)

*Primary Examiner*—Deborah Yee
*Attorney, Agent, or Firm*—Banner & Allegretti, Ltd.

[57] ABSTRACT

A method of producing diamond crystals from a metallofullerite matrix independent of external application of pressure is disclosed. The method comprises hyperquenching a portion of a metallic sold comprising a metal carbon matrix of an allotropic metal and metallofullerites of that allotropic metal after the portion has been heated to or near the critical temperature for its percentage composition of the allotropic metal, carbon, and other effective ingredients. The quenching is conducted rapidly enough to collapse fullerene structures present in the matrix into diamond crystals. The resulting metal-carbon matrix of an allotropic metal, metallofullerites of the allotropic metal, and diamond crystals are also disclosed.

29 Claims, No Drawings

OTHER PUBLICATIONS

Ron Dagani, *Chemical & Engineering News,* Jul. 20, 1992; "Graphitic Microtubules: Bulk Synthesis Opens up Research Field".

Ph Gerhardt, S. Löffler and K. H. Hoffmann; "Polyhedral Carbon Ions in Hydrocarbon Flames"; *Chemical Physics Letters;* vol. 137, No. 4; Jun. 19, 1987, pp. 306–310.

H. W. Kroto, J. R. Heath, S. C. O'Brien, R. F. Curl & R. E. Smalley; "$C_{60}$; Buckminsterfullerene" *Letters to Nature;* vol. 318; Nov. 14, 1985; pp. 162–163.

Q. L. Zhang, et al.; "Reactivity of Large Carbon Clusters; Spheroidal Carbon Shells and Their Possible Relevance to the Formation and Morphology of Soot"; *The Journal of Physical Chemistry;* vol. 90, No. 4; Feb. 13, 1986; pp. 525–528.

W. Krätschmer, N. Sorg and Donald R. Huffman; "Spectroscopy of Matrix–Isolatede Carbon Cluster Molecules Between 200 and 850 nm Wavelength"; *Surface Science 156 (Jun. 1985); pp. 814–821.*

"Science/Technology"; *Chemical & Engineering News,* Jun. 22, 1992; p. 24.

Ron Dagani, *Chemical & Engineering News,* Jul. 13, 1992; "Fullerenes in Nature: $C_{60}$ and $C_{70}$ Found in Ancient Russian Rock"; p. 6.

Statelog, North Carolina State University, Nov. 5, 1991; "Exploring the 'Buckyball'"; p. 4.

Thomas L. Altshuler; *Advanced Materials & Process,* Sep. 1991; "Atomic–Scale Materials Characterization"; pp. 18–23.

Robert F. Curl & Richard E. Smalley; *Scientific American,* Oct. 1991; "Fullerenes"; pp. 54–63.

T. Pradeep et al; *J. Am Chem. Soc.,* Mar. 11, 1992, vol. 114; "A Novel $FeC_{60}$ Adduct in the Solid State"; pp. 2272–2273.

METHOD OF PRODUCING DIAMOND CRYSTALS FROM METALLFULLERITE MATRIX AND RESULTING PRODUCT

FIELD OF THE INVENTION

This application is a continuation of application Ser. No. 07/921,904 filed on Jul. 29, 1992, now abandoned, which is a continuation-in-part of application No. 07/820,842, filed Jan. 15, 1992, for "Simultaneous Recrystallization and Precipitation of Diamond Crystals from Ferro-Carbon and Method of Forming Same." The present invention is also related to application Ser. No. 07/816,636, filed Dec. 31, 1991, now U.S. Pat. No. 5,288,342 for "Solid Metal-Carbon Matrix of Metallofullerites and Method of Forming Same." Both of these applications are assigned to the assignee of the present invention and the contents of each are incorporated entirely herein by reference.

The present invention relates to a method of forming diamond crystals from metallofullerite matrices and the resulting diamond product.

BACKGROUND OF THE INVENTION

Diamonds are the hardest known substance found in nature. Diamond is defined as a mineral composed entirely of the allotropic form of the element carbon, crystallized in the isometric system, and covalently bound by single bonds in tetrahedral fashion. Diamond also has the highest thermal conductivity of any known substance which, at room temperature, is approximately five times the thermal conductivity of copper. Because of this high thermal conductivity, diamonds used in cutting tools do not become hot, a quality which contributes greatly to their usefulness and desirability in such applications.

Man-Made diamonds were first successfully synthesized by the General Electric Company in 1955. Since then, diamond has been synthesized in a number of ways, but all of which require application of extremely high temperatures and external pressures. The typical methods include static crystallization from molten metals or alloys at pressures of 50 or more kilobars and temperatures greater than 1500° K. (2240° F.); shock conversion from graphite at pressures of about 300 kilobars and temperatures of about 1300° K. (1880° F.); and by static conversion from graphite at pressures of more than about 130 kilobars and transient temperatures more than about 3300° K. (5480° F.).

With these general techniques as background, it becomes evident that any method of forming diamonds synthetically that can be carried out at more moderate temperatures and externally applied pressures or, indeed, in the absence of extreme temperatures or externally applied pressures would provide a tremendous advance in the production and use of synthetic diamonds.

As set forth in application No. 07/816,636 set forth above ("the '636 application"), "fullerenes" is a term given to a recently postulated and discovered form of molecular carbon in which the carbon atoms are joined to form spheres, or sphere-like structures. Because of the resemblance between the structure of these molecules and the geodesic domes designed and championed by the architect, Buckminster Fuller, such molecules have been designated as "fullerenes," and the basic and most stable molecule, a sphere having 60 carbon atoms, has been designated "Buckminsterfullerene." For the same reasons, fullerenes have also been referred to as "buckyballs."

As further set forth in the '636 application, it has now been discovered that fullerene structures can be produced in metallic matrices, particularly in allotropic metals such as iron.

OBJECT AND SUMMARY OF THE INVENTION

Therefore, it is an object of the present invention to provide a method of producing diamond crystals from a metallofullerite matrix independent of external application of pressure. It is another object of the invention to provide a metallic solid that comprises a metal carbon matrix of an allotropic metal, metallofullerites of the allotropic metal, and diamond crystals.

The invention meets these objects by providing a method of producing diamond crystals from a metallofullerite matrix independent of external application of pressure by hyperquenching a portion of a metallic solid comprising a metal carbon matrix of an allotropic metal and metallofullerites of that allotropic metal in which the portion has been previously heated to at or near the critical temperature for its percentage composition of the allotropic metal, carbon, and other effective ingredients rapidly enough to collapse fullerene structures present in the matrix into diamond crystals. In another aspect, the invention is the resulting metal-carbon matrix of an allotropic metal, metallofullerites of the allotropic metal, and diamond crystals.

The foregoing and other objects, advantages and features of the invention, and the manner in which the same are accomplished, will become more readily apparent upon consideration of the following detailed description of the invention taken in conjunction with the accompanying drawings, which illustrate preferred and exemplary embodiments.

DETAILED DESCRIPTION

The invention is a method of producing diamond crystals from a metallofullerite matrix independent of external application of pressure. In particular, the method comprises the step of heating a portion of a metallic solid which comprises a metal-carbon matrix of an allotropic metal and metallofullerites of the allotropic metal to or near the critical temperature for its percentage composition of the allotropic metal, carbon and other effective ingredients. The heated matrix is then hyperquenched rapidly enough to collapse the fullerene structures present in the matrix into diamond crystals.

As used herein, the term "allotropic" refers to a metal which exhibits allotropy, which is also referred as polymorphism. In general, allotropy refers to the existence of a substance in two or more forms which are significantly different in physical or chemical properties. When used with respect to metals, allotropy refers to the ability to exist in two or more crystal structures, or in an amorphous state and at least one crystal structure. Similarly, the term "matrix" refers to the principal phase or aggregate in which another constituent is embedded. The term "metallofullerite" is used consistently with its use in the '636 application referred to earlier, and particularly refers to metal-fullerene compositions. Metallofullerites can take the form of iron atoms in crystal lattices with fullerenes, iron atoms encapsulated in fullerene molecules, chains of fullerene molecules wrapped around a plurality of iron atoms, and combinations of these forms. Stated differently, the matrix can be expressed as one of an allotropic metal and fullerene molecules regardless of the particular use of the term "metallofullerites" by others in this rapidly growing art.

The term "quenching" in metallurgy refers to the quick cooling of metal or alloys by any method that reduces temperature rapidly enough to cause a phase matrix change. Typical quenching methods include immersion in a cold fluid such as water or oil, but the term is not limited to such methods and can comprise any appropriate technique that provides the rapid cooling and its associated effects. If the metal or alloy is in the liquid state and the quench time is extremely short (for example less than a second), no crystallization will occur, and the resulting product will have an amorphous or glass-like structure. In general, the term refers to rapid cooling of any type. In ferrous alloys, quench hardening refers to the step of hardening the alloy by austenitizing and then cooling at a rate such that a substantial amount of austenite transforms to martensite. In other words, the rapid cooling causes a significant change in the characteristic of the structure of the material being quenched. The prefix "hyper" is used in its usual sense to designate the thought of above, beyond, super, or excessive; in other words, an extremely rapid quenching with accompanying significant changes in the structure being quenched.

It will be understood that the method of the invention can comprise the separate steps of heating the metallic solid near or to the critical temperature, followed by hyperquenching it, or alternatively, as the single step of hyperquenching the heated metallic solid.

The metal-carbon matrix can be one in which the allotropic metal is selected from the group consisting of aluminum, chromium, cobalt, iron, molybdenum, nickel, platinum, titanium, tungsten and vanadium. In preferred embodiments, the metallic solid will comprise a ferro-carbon matrix; i.e. one containing iron.

Although the applicant does not wish to be bound by any particular theory, it appears that the rapid quenching of the metallic solid containing the fullerenes exerts forces on the fullerenes which compresses them rapidly into the resulting diamond structures. The conversion of fullerenes to diamonds under extreme pressures is consistent with the known structural and theoretically expected properties of fullerenes, and with other experimental work carried out by other researchers.

As used herein, the terms "collapse" or "compress" are not necessarily intended to represent an exact description of what occurs on an atomic or molecular level, although such may be the case. Instead, they are used at least partially in their general sense to paint a word picture of what the physical evidence suggests has occurred.

Once the metallic solid matrix has been hyperquenched, the iron can be removed from it, and in particular the step of removing the iron can comprise treating the matrix with acid to dissolve and remove the iron while leaving diamond crystals behind. Nitric ($HNO_3$) and hydrochloric (HCl) acids are appropriate for this purpose. Alternatively, the iron can be removed mechanically, for example by grinding it into a fine powder and removing the iron magnetically, or by forming the solid matrix into a foil (typically by rolling) in which the diamond crystals are evident, and can be easily removed.

Although the invention can be described most simply as hyperquenching a heated metallofullerite matrix, in another embodiment it can comprise the step of forming the metallofullerite matrix prior to the step of heating the matrix to or near the critical temperature and then hyperquenching it. As set forth in the '836 application, the step of forming fullerenes comprises forming fullerenes in a mixture of a high carbon iron constituent and a low carbon iron constituent in an amount sufficient for the mixture to have a desired carbon content, and in which the mixture has been raised to a temperature at which the high carbon constituent would be liquidus and below the temperature at which the lower carbon constituent would be liquidus, by heating the mixture to and temporarily holding the mixture at a temperature within the temperature range of allotropic transformation for the mixture with the desired carbon content for a time sufficient for the carbon present to form fullerenes in a metallofullerite matrix.

For example, it will be seen that for a mixture in which the final desired carbon concentration is 1.2%, there is a temperature range of between about 1340° C. and 1450° C. at which a 1.2% carbon final mixture will remain in its range of allotropic transformation (i.e. some austenite and some liquid). As a comparative example, if the amount of carbon were 1% in the desired final mixture, the range would have to be slightly different, for example, somewhere between about 1360° C. and 1470° C. In general, however, it is preferable to maintain the mixture at a temperature as close as possible to the line of allotropic transformation between the austenitic solid and the mixture of the austenitic solid and liquid.

In preferred embodiments, the metallic solid of the invention can comprise between about 0.35 and 6.5 percent carbon by weight.

It will be understood by those familiar with alloy systems such as binary and ternary alloys and their phase diagrams, that a similar appropriate temperature can be selected from any other phase diagram based on the recited qualification: heating the mixture to and holding the mixture at a temperature within the temperature range of allotropic transformation for the mixture with the desired carbon content for a time sufficient for the carbon present to form the fullerenes. Thus, although the phase diagrams included herein are those of the carbon iron binary alloy system, it will be understood that other similar alloy systems and their phase diagrams can be used to produce the metallofullerites of the present invention and the resulting diamonds. It will be further understood that the invention is not limited to binary or ternary alloy systems, but is similarly applicable to more complex alloy systems.

Furthermore, it will be understood by those familiar with metallurgy, that such phase transformations and related temperature and compositions will exist for an alloy regardless of whether or not particular researchers have set those parameters forth in a phase diagram. Thus, the invention does not depend on the existence of such phase diagrams. Rather, where phase diagrams are available, they provide a straightforward method of selecting appropriate particular temperatures for carrying out the invention in particular alloys.

Additionally, it is expected that although the invention provides a method of forming diamonds in the absence of any external pressure, that combinations moderate external pressures and adjusted temperatures will likewise fall within the spirit and scope of the invention claimed herein.

The steps of forming the metallofullerite matrix can be expressed in several manners. For example, a mixture of a high carbon iron constituent and a low carbon iron constituent can be mixed when both are in the solid phase in an amount sufficient to form the iron mixture with the desired carbon content. That mixture can then be heated to a temperature at which the high carbon constituent would be liquidus and below the temperature at which the lower carbon constituent would be liquidus. For example, a high carbon material such as 4.3% carbon will be totally liquidus at a temperature of 1340° C. Alternatively, a low carbon material such as 0.01% carbon will be totally solid at that same temperature. Both of these characteristics are illustrated by matching the appropriate percentages of carbon and centigrade temperatures on an iron-carbon phase diagram. If these materials are mixed in a proportion that forms a 1.2% carbon mixture (for example 7 parts of the high carbon material with 18 parts of the low carbon material), the temperature of 1340° C. will meet the three characteristics of the invention: (1) it is a temperature at which the high carbon constituent would be totally liquidus; (2) it is a temperature at which the lower carbon constituent would be solid; and (3) it is a temperature at which a mixture having the final carbon content based on the proportional mixture of the two starting materials will be within its allotropic transformation range.

Alternatively, the step of heating the mixture to form the metallofullerite matrix comprises melting the high carbon iron constituent to total liquidus and then introducing the low carbon constituent as a solid into the high carbon liquidus in an amount sufficient to form the mixture with the desired concentration. Concurrently, the temperature is held at a temperature lower than the temperature at which the low carbon component would become liquidus.

In another alternative, the iron mixture is heated to a temperature at which the high carbon constituent would be liquidus, but at which the lower carbon constituent would be solid and at which temperature a solid defined by the mixture would remain solid until the mixture equilibrates at that temperature. Following this, the mixture is heated to the higher temperature at which it is partially liquidus and partially allotropic solid. Using 1.2% steel as the example again, the temperature at which a solid defined by the mixture would remain solid would be below the austenite-austenite/liquid boundary; e.g. a temperature of about 1230° C. or 2250° F. Following equilibration at that temperature, the mixture is then again heated to the temperature within the allotropic transformation range and held for a period sufficient to form the fullerenes.

As stated earlier, because the starting material for the diamond-making process of the invention can be the metallofullerite matrix, the method can further comprise the step of cooling a just-formed metallofullerite matrix to an ambient temperature prior to the step of heating the metallofullerite matrix to or near the critical temperature. Stated differently, a previously formed metallofullerite matrix can serve as the starting material.

With respect to the step of forming fullerenes, heat can be added as necessary to temporarily hold the mixture at the temperature within the allotropic transformation temperature range. As set forth with respect to previous examples, for 1.2% by weight carbon material, the preferred temperature within the allotropic transformation range is approximately 2450° F. (1340° C.).

As set forth herein, in order to form diamond from the metallofullerite matrix, the metallofullerite matrix must be heated to or near its critical temperature. As used herein, the critical temperature (also referred to as the critical point or the transformation temperature) is the temperature at which a change in crystal structure, phase, or physical properties occurs. In the method of the invention, the term "near", when used in conjunction with the critical temperature, means that the precise critical temperature does not necessarily have to be reached, but that the temperature will be within the allotropic transformation range that is bordered by the critical temperature.

Using 1.2% carbon as an appropriate comparison, in the method of the invention such a composition would be heated to or near a critical temperature of approximately 1700° F. (930° C.). The step of hyperquenching the heated matrix preferably comprises drastically and rapidly reducing the temperature to quench the heated metallofullerite matrix. In a preferred embodiment, this step comprises quenching the heated matrix in a mixture of dry ice and methanol at a temperature of approximately −100° F. (approximately −75° C.). Again, it must be emphasized that the selection of the critical temperature is dependent upon the binary, ternary, or other alloy system used to produce both the fullerenes and the diamond crystals. Nevertheless, critical temperature for any such alloy can be quickly and straightforwardly identified from well-known, published and existing binary, ternary, or more complex alloy phase diagrams such as those set forth herein.

In its product embodiment, the invention comprises a metal-carbon matrix of an allotropic metal, fullerenes (including metallofullerites of the allotropic metal), and diamond crystals. As set forth with respect to the method, the allotropic metal is selected from the group consisting of aluminum, chromium, cobalt, iron, molybdenum, nickel, platinum, tungsten and vanadium. In most preferred embodiments, the allotropic metal comprises iron and the metallofullerites comprise iron fullerites. Consistent with most preferred structural steels, the metallic solid can comprise between about 0.35% and 2.25% carbon by weight, and in a preferred embodiment comparable to the composition of many steels, the metallic solid comprises about 1.2% carbon by weight.

EXAMPLE

A first sample of the invention was prepared for a final analysis of 1.2% carbon. A final melt size of 5 lbs. was selected. Accordingly, 1.4 lbs. of 4.3% high carbon material (i.e. cast iron) was mixed with 3.6 lbs. of 0.01% carbon material. A small amount of 0.25% borax was added as a degassifier. A gas muffle furnace was heated to 2250° F. and the material was placed in the furnace in a carbon-graphic crucible and covered. When the material reached 2250° F., the heat was increased to 2450° F. and was held for 20 minutes. The heat was then reduced to 2250° F. for 10 minutes. When the molten material lost its ephoresence, the furnace was returned to 2450° F. and temporarily held at that temperature for 15 minutes. The furnace was then shut down and the material removed to cool to room temperature.

This material was then heated to 1700° F. for 10 minutes and hyperquenched in a mixture of dry ice and methanol at approximately −100° F. Following its return to room temperature, the material was tested and determined to have a hardness of 64 on the Rockwell scale (Rc64) without any further tempering or the like. The microstructures illustrated in the figures herein were determined by removing a section of material and preparing and etching it with 2% nital reagent.

Scanning tunneling micrographs (STM) of 1.2% carbon steel were taken and compared to STM images of product made according to example 1. As known to those familiar with such techniques, the STM is a relatively recent device that uses a tunneling current that passes from a minute probe to an electrically conducting sample. The standoff between the probe and the specimen surface is about 10 angstroms (Å). A piezoelectric crystal scanner moves the probe in three cartesian coordinates (X, Y and Z) corresponding to movement along the lengthwise and widthwise direction of the sample, as well as along its surface height. The tunneling current varies as the exponent of the inverse of the distance between the probe and the sample according to the following formula:

$$I = c^{-kh}$$

where I is the tunneling current, h is the standoff distance between the probe tip and the specimen surface, and c and k are constants.

Accordingly, because of the exponential relationship between current (I) and standoff distance (h), very large changes occur in the tunneling current corresponding to very small changes in the distance in the Z (height) direction. In many STM's, the probe is controlled to move up and down to maintain a constant current while scanning in the X and Y directions. The results have a three-dimensional appearance as set forth herein. In layman's terms, the STM can produce a magnification of up to 20 million times with resolution in lateral directions to 0.01 nanometers (nm, $10^{-9}$ meters) and in the vertical direction to 0.001 nm. This magnification is over 20 times as great as a transmission electron microscope (TEM) and is approximately 100 times as great as a scanning electron microscope (SEM). All of the STM plots include the designation of the X, Y, and Z size of the plot.

STM plots of the material of the present invention and taken over several different areas of a single sample establish its consistent appearance.

A first difference between the structure of the standard steel and the material of the invention is the much finer and more consistent structure illustrated in the invention than in the standard steel. For example, the extremely smooth and almost linear portions is product of the investigation are in significant contrast to the topography of conventional.

In the specification, there have been disclosed typical preferred embodiments of the invention and although specific terms have been employed, they have been used in a generic and descriptive sense only and not for purposes of limitation, the scope of the invention being set forth in the following claims.

That which is claimed is:

1. A method of producing diamond crystals from a metallofullerite matrix independent of external application of pressure, the method comprising:
    hyperquenching a metal-carbon matrix that has been heated to about its critical temperature, said matrix containing iron and iron fullerites, at a rate sufficiently rapid to collapse fullerene structures present in the matrix into diamond crystals.

2. A method according to claim 1 and further comprising the step of:
    recovering said diamond crystals by removing iron from the quenched matrix.

3. A method according to claim 2 wherein the step of removing iron comprises treating the matrix with acid to dissolve and remove the iron while leaving the diamond crystals behind.

4. A method according to claim 2 wherein the step of removing iron comprises removing iron mechanically.

5. A method of producing diamond crystals from a metallofullerite matrix independent of external application of pressure, the method comprising:
    heating a metallo-carbon matrix containing iron and iron fullerites to about its critical temperature; and
    hyperquenching the heated matrix at a rate sufficiently rapid to collapse fullerene structures present in the matrix into diamond crystals.

6. A method according to claim 5 and further comprising the step of:
    recovering said diamond crystals by removing iron from the quenched matrix.

7. A method according to claim 6 wherein the step of removing iron comprises treating the matrix with acid to dissolve and remove the iron while leaving the diamond crystals behind.

8. A method according to claim 6 wherein the step of removing iron comprises removing iron mechanically.

9. A method of producing diamond crystals from a metallofullerite matrix independent of external application of pressure, the method comprising:
    forming fullerenes in a mixture of a high carbon iron constituent and a low carbon iron constituent in an amount sufficient for the mixture to have a desired carbon content, and in which the mixture has been raised to a temperature at which the high carbon constituent would be liquidus and below the temperature at which the lower carbon constituent would be liquidus, by heating the mixture to and temporarily holding the mixture at a temperature within the temperature range of allotropic transformation for the mixture with the desired carbon content for a time sufficient for the carbon present to form fullerenes in a matrix of the iron;
    heating the iron-fullerene matrix to or near the critical temperature for its percentage composition of iron, carbon and other effective ingredients; and
    hyperquenching the heated iron-fullerene matrix rapidly enough to collapse fullerene structures present in the mixture into diamond crystals.

10. A method according to claim 9 wherein the step of forming fullerenes further comprises heating a mixture of a high carbon iron constituent and a low carbon iron constituent in an amount sufficient to form an iron mixture with a desired carbon content to a temperature at which the high carbon constituent would be liquidus and below the temperature at which the lower carbon constituent would be liquidus.

11. A method according to claim 10 wherein the step of heating the mixture further comprises:
    melting a high carbon iron constituent to total liquidus; and
    introducing a low carbon iron constituent as a solid into the high carbon component liquidus in an amount sufficient to form a mixture with a desired carbon concentration while temporarily holding the temperature lower than the temperature at which the low carbon component becomes liquidus.

12. A method according to claim 9 further comprising the step of cooling the iron-fullerene matrix to ambient temperature prior to the step of heating the matrix to the critical temperature.

13. A method according to claim 10 wherein the step of heating the iron mixture further comprises mixing a high carbon iron constituent and a low carbon iron constituent in an amount sufficient to form a mixture with a desired carbon content.

14. A method according to claim 13 wherein the step of heating the iron mixture comprises:
   heating the iron mixture to a temperature at which the higher carbon constituent would be liquidus, but at which the lower carbon constituent would be solid and at which temperature a solid defined by the mixture would remain solid until the mixture equilibrates at that temperature; and
   heating the mixture to a higher temperature at which the mixture is partially liquidus and partially allotropic solid.

15. A method according to claim 9 wherein the step of forming fullerenes comprises adding heat as necessary to temporarily hold the temperature within the temperature range of allotropic transformation for the iron mixture with the desired carbon content.

16. A method according to claim 10 wherein:
   the step of heating the iron mixture comprises heating the mixture to a first temperature above the temperature in the iron-carbon equilibrium at which the higher carbon constituent becomes totally liquidus, while below the temperature at which either the lower carbon constituent or the mixture become liquidus; and
   the step of forming fullerenes comprises heating and then temporarily holding the mixture at a temperature in the iron carbon equilibrium at which iron having a composition defined by the mixture is present as a mixture of one of its allotropic forms and a liquidus.

17. A method according to claim 16 wherein the iron mixture has a desired carbon concentration of 1.2 percent by weight, and wherein the step of heating the mixture comprises heating the mixture to approximately 2450° F.

18. A method according to claim 16 wherein the iron mixture has a desired carbon concentration of 1.2 percent by weight, and wherein the step of temporarily holding the mixture comprises temporarily holding the mixture at approximately 2450° F.

19. A method according to claim 9 wherein:
   the desired carbon content of the mixture is 1.2 percent carbon;
   the step of heating the metallofullerite matrix to the critical temperature comprises heating the metallofullerite matrix to 1700° F.; and
   the step of hyperquenching the heated matrix comprises quenching the matrix to a temperature of −100° F.

20. A method according to claim 9 and further comprising the step of removing iron from the quenched matrix.

21. A method according to claim 20 wherein the step of removing iron comprises treating the matrix with acid to dissolve and remove the iron while leaving the diamond crystals behind.

22. A method according to claim 20 wherein the step of removing iron comprises removing iron mechanically.

23. A metallic solid comprising a metal-carbon matrix containing iron, fullerenes, and diamond crystals.

24. A metallic solid according to claim 23 comprising between about 0.35 and 6.5 percent carbon by weight.

25. A metallic solid according to claim 23 comprising about 1.2 percent carbon by weight.

26. A metallic solid according to claim 23 wherein said fullerenes comprise iron fullerites.

27. A method as in claim 1 wherein said hyperquenching step comprises:
   hyperquenching the heated metallo-carbon matrix by cooling said matrix in water, oil, or a mixture of dry ice and methanol.

28. A method as in claim 5 wherein the heating step comprises:
   heating said metallo-carbon matrix to a temperature within the allotropic transformation bordered by the critical temperature of said matrix.

29. A method as in claim 5 wherein said hyperquenching step comprises:
   hyperquenching the heated metallo-carbon matrix by cooling said matrix in water, oil, or a mixture of dry ice and methanol.

* * * * *